United States Patent

[11] 3,583,580

| [72] | Inventor | Robert Dean |
| | | Felixstowe, Suffolk, England |
| [21] | Appl. No. | 796,817 |
| [22] | Filed | Feb. 5, 1969 |
| [45] | Patented | June 8, 1971 |
| [73] | Assignee | Fisons Limited |
| | | Felixstowe, Suffolk, England |
| [32] | Priority | Feb. 20, 1968 |
| [33] | | Great Britain |
| [31] | | 8161/68 |

[54] OUTLOADER
6 Claims, 7 Drawing Figs.

[52] U.S. Cl. ................... 214/6, 214/16.4
[51] Int. Cl. .................. B65g 57/30
[50] Field of Search ......... 214/7, 6.2, 6 M, 6 P, 6 G; 198/20 T, 154

[56] References Cited
UNITED STATES PATENTS
2,706,053   4/1955   Doller ................ 214/7

| 2,857,040 | 10/1958 | Campbell | 214/6(.2)X |
| 2,947,125 | 8/1960 | Wilson et al. | 214/6(.2)X |
| 3,113,683 | 12/1963 | Von Gal, Jr. | 214/6(.2)UX |
| 3,171,550 | 3/1965 | Gajdostik et al. | 214/6(.2) |
| 3,223,260 | 12/1965 | Bright | 198/154X |
| 3,268,061 | 8/1966 | De Good et al. | 198/154X |
| 3,450,275 | 6/1969 | Carlen, Jr. | 214/6(.2)X |
| 3,478,897 | 11/1969 | Dykeman | 214/6(.2) |

*Primary Examiner*—Gerald M. Forlenza
*Assistant Examiner*—Robert J. Spar
*Attorney*—Wenderoth, Lind and Ponack

ABSTRACT: A machine for handling pallets. The machine has a substantially horizontally disposed twin band conveyor. A support means is located above the platform and is adapted to support a pile or stack of empty pallets. A platform is located between and below the bands of the conveyor end is capable of raising an empty pallet from the conveyor so as to engage it with the support means.

PATENTED JUN 8 1971
3,583,580
SHEET 1 OF 4
FIG.I
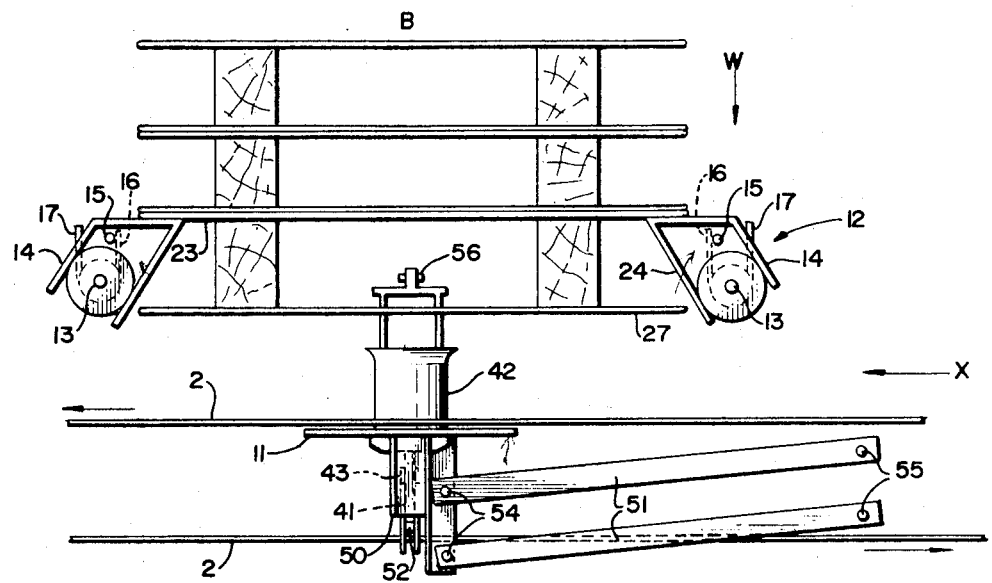
FIG.2
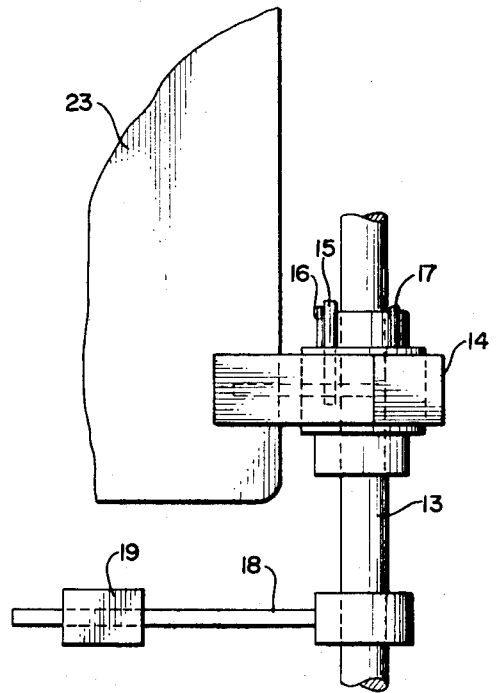
INVENTOR
ROBERT DEAN
BY Wenderoth, Lind & Ponack
ATTORNEYS PATENTED JUN 8 1971
3,583,580
SHEET 2 OF 4
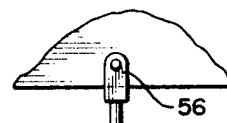
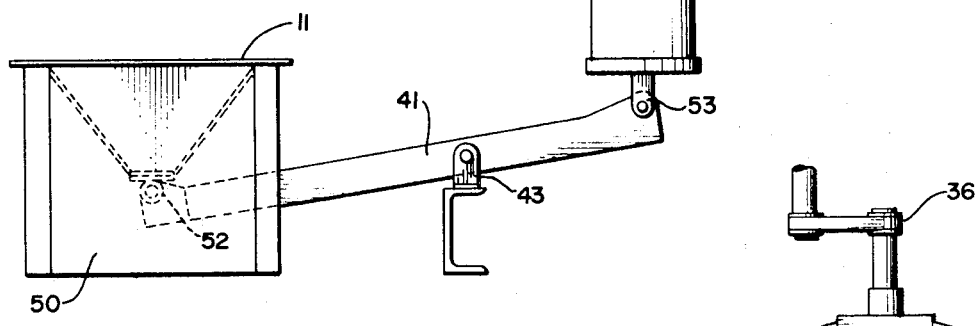
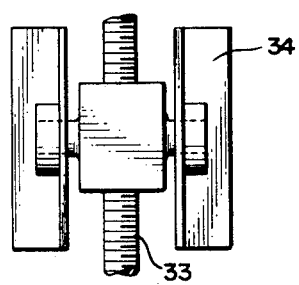
INVENTOR
ROBERT DEAN
BY *Wenderoth, Lind & Ponack*
ATTORNEYS

OUTLOADER

The present invention relates to a machine for handling pallets, skids, stillages and the like.

Pallets are transportable platforms, often made of wood, upon which are stacked groups of articles such as boxes, sacks and the like. By this means it is possible to store, transport and generally handle the articles on the pallet as a group.

After unloading the articles from a pallet onto for example lorries, it is necessary to remove the empty pallet from the unloading area which usually comprises a raised staging. From the operative's point of view the speediest way of achieving this is merely to drop the pallet off the side of the staging to form a pile of pallets. As a result of dropping, the pallets are frequently damaged and form a pile of pallets in the dropping area which is badly built and unstable. The present invention provides a machine which speeds the handling of the pallets, avoids damage to the pallets and at the same time forms a neat pile of empty pallets which is easy and safe to handle by, for example, forklift trucks.

Accordingly the present invention provides a machine for handling pallets which comprises a substantially horizontally disposed twin band conveyor, means for supplying empty pallets to the conveyor, a support means and a platform, said support means being located above the platform and being adapted to support a pile or stack of empty pallets and said platform being located between and below the bands of the conveyor and being capable of raising an empty pallet from the conveyor so as to engage it with the support means.

Preferably, the platform is connected to one end of a lever, the other end of the lever being connected to a power cylinder capable of pivoting said lever about its fulcrum thereby raising and lowering said platform.

Preferably, the support means comprises a plurality of pivoted members, desirably at least three, capable of being rotatably moved from a support position by contact with a rising pallet whereby the pallet passes the members which thereupon resume their support position. Desirably, the pivoted members are loose fitting on a pair of spaced parallel shafts, the distance apart of the shafts being greater than the width of the pallet. Stop members may be provided on the shafts which engage with a projection on the pivoted members whereby movement of the pivoted members is limited.

The means for supplying empty pallets to the conveyor may be an additional horizontally disposed conveyor. Preferably, the means for supplying empty pallets is a horizontally disposed conveyor adapted to be moved vertically into alignment with an end of the twin band conveyor and into alignment with an end of a conveyor provided with a discharge means such as a chute. Desirably, the conveyor provided with a discharge means is located above the twin band conveyor. Desirably also, a lower horizontally disposed conveyor is provided below the twin band conveyor, said vertically movable conveyor being adapted to be moved into alignment with an end of this lower conveyor also.

The machine of the present invention is preferably capable of being moved on a wheel and track arrangement.

Machines according to the present invention are illustrated in the accompanying drawings wherein:

FIG. 1 is a front elevation of one machine.

FIG. 2 is an enlarged plan view on W of FIG. 1.

FIG. 3 is an enlarged side elevation viewed from X of FIG. 1 of the lifting mechanism.

FIG. 6 is a side elevation of a lifting mechanism for trolley 7 and

FIG. 7 is a view on Y of item 34 of FIG. 6.

Figure 4:
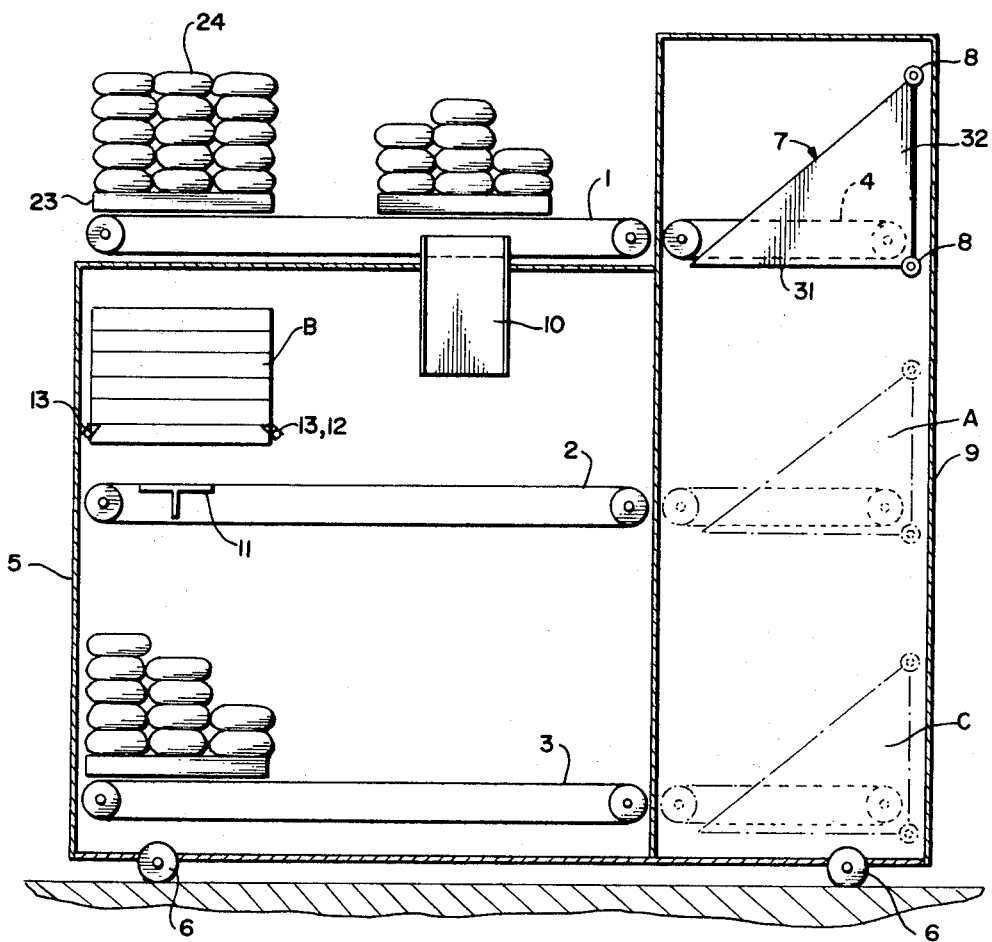
FIG. 4 is a front elevation of another machine.

Referring to FIG. 1 there is illustrated part of a horizontally disposed twin band chain conveyor 2, located between the bands of which is a lifting platform 11. Above platform 11 is located a support means generally indicated at 12.

The support means 12 is illustrated in FIGS. 1 and 2 and consists of two parallel shafts 13 spaced along which are a plurality of pawls 14. The pawls 14 are loose fitting on the shafts 13 and are provided with projections 15 which are integral with the pawl. These projections lie between vertical members 16 and 17 which are secured to shafts 13. At one end of each shaft 13 are fitted levers 18 on which are fixed weights 19. The upper face 23 and the lower face 27 of a two-faced pallet are shown in FIGS. 1 and 2.

The lifting mechanism is illustrated in FIGS. 1 and 3. It is seen from these figures that platform 11 has an underneath framework 50 which is connected to a lever 41 (as illustrated in FIGS. 1 and 3) and two pairs of parallel guide members 51 (as illustrated in FIG. 1, only one pair of parallel guide members 51 being shown).

Referring to FIGS. 1 and 3 lever 41 is connected to platform 11 at pivot 52 and is connected to power cylinder 42 at pivot 53. Lever 41 turns about fulcrum 43 and power cylinder 42 is attached to any suitable framework at 56.

Referring to FIG. 1, parallel guide members 51 are pivotally connected at points 54 with the underneath framework 50 of platform 11 and at points 55 with a suitable framework, not shown.

A similar pair of parallel guide members is provided at the other side so forming a group of four members having a parallele-piped configuration.

In operation an empty double-faced pallet on conveyor 2 is stopped above platform 11 by means of a limit switch. This same switch initiates the operation of power cylinder 42 which causes lever 41 to rotate about fulcrum 43 thus raising platform 11. The movement of the platform is stabilized by means of the two pairs of guide members 51. The first pallet to be raised by platform 11 engages with the surface 24 of pawl 14 thereby forcing pawl 14 upwards until the upper face 23 of the pallet clears surface 24 of pawl 14 when pawl 14 falls to the position shown in FIG. 1. At this stage platform 11 retracts to its initial position, the pallet being retained in the elevated position by pawls 14. Subsequent pallets on being raised by platform 11 engage with the lower face 27 of the pallet which is held by pawls 14 and again pawls 14 are forced upwards before engaging with the latest pallet to be raised. In this way a pile of empty pallets is created as illustrated at B in FIG. 1.

In order to maintain good contact between pallet 23 and pawl 14, fixed member 16 provides a stop against which projection 15 bears so preventing further rotation of pawl 14 in that direction. Fixed member 17 prevents pawl 14 from being turned too far by the pallet during the raising thereof. When projection 15 bears against member 17, shaft 13 is rotated so raising weight 19. As soon as the upper face of the pallet being raised, clears surface 24 of pawl 14, weight 19 causes shaft 13 to rotate in the opposite direction until weight 19 reaches its rest position which corresponds with the position of pawl 14 in FIG. 1.

Figure 5:
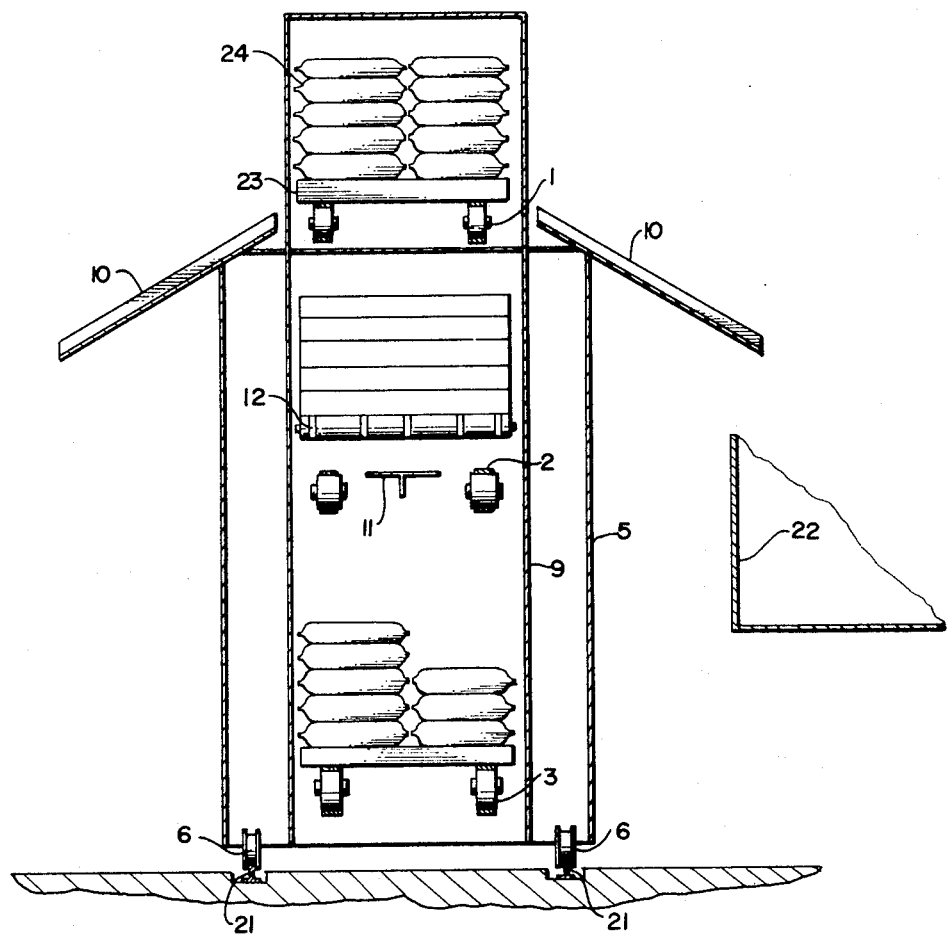
FIG. 5 is a side elevation of the machine illustrated in FIG. 4.

Referring to FIGS. 4 and 5 there is illustrated a particularly useful embodiment of the present invention. In these figures the items described in FIG. 1 are referred to using the same identifying numerals and include conveyor 2, platform 11 and support means 12. As well as conveyor 2 there are also conveyors 1 and 3 and a vertically movable conveyor 4 all of which are supported in a framework 5 which is provided with wheels 6 running on rails 21. Conveyor 4 is supported by a trolley 7 which consists of a baseplate 31 constructed of angle iron, two ends of the baseplate being provided with triangular side frames 32 connected by crossbars. Each of the triangular side frames carries four wheels 8 which are arranged to run in a track 9 provided in framework 5. Trolley 7 is moved up and down track 9 by any suitable lifting mechanism such as that illustrated in FIGS. 6 and 7. In these latter figures are illustrated a lifting screw 33 which is driven via a drive 36 from a motor not shown. The screw passes through a nut 34 which is attached to a crossbar 35 between the two triangular side frames 32 of trolley 7. Rotating screw 33 by means of drive 36 causes nut 34 to rise or fall on screw 33 depending on the direction of rotation, this rise or fall being transmitted to trolley 7.

In conjunction with conveyor 1 is provided a chute 10.

In conjunction with conveyor 2 is provided a lifting platform 11 and a support mechanism 12, which are described in detail in connection with FIGS. 1 to 3

A lorry which is to be loaded is illustrated at 22. The lorry is positioned parallel to rails 21

In operation a pallet 23, laden with sacks 24, is deposited on conveyor 1. Conveyor 1 is operated to transfer pallets such as pallet 23 to a point adjacent chute 10 opposite which it is stopped by means of a limit switch. At this point the sacks are transferred mechanically or manually to chute 10 which delivers the sacks into lorry 22. As the space in the lorry alongside the chute becomes filled, the machine is rolled along rails 21 to a new position.

When pallet 23 has been unloaded, conveyor 1 is operated so as simultaneously to transfer the empty pallet to conveyor 4 and to transfer a laden pallet to chute 10, the laden pallet having been placed at the end of conveyor 1 by a forklift truck. Conveyor 4 is then lowered to position A and the empty pallet is transferred from conveyor 4 to conveyor 2 which transports the pallet to lifting platform 11.

A limit switch stops conveyor 2 so that the pallet rests above platform 11 whereupon operation continues as described in relation to FIGS. 1 to 3.

It sometimes happens that it is unnecessary to unload completely the pallet at the chute station. In this case the pallet is transferred to conveyor 4 which is then lowered to position C. In this position the pallet is transferred to conveyor 3 to await transmission back to the store.

The machine of the present invention provides a convenient and efficacious means of transferring sacks and the like to lorries. The machine also effectively disposes of the empty pallet and can be designed to dispose of partly emptied pallets.

I claim:

1. A machine for handling pallets comprising three superimposed tiers of conveyors; a horizontal transfer conveyor positioned adjacent said tier conveyors, said transfer conveyor being vertically movable into alignment with the end of each of said tier conveyors and adapted to receive pallets therefrom and discharge pallets thereon; the middle of said tier conveyors being a twin band conveyor; an elevating means positioned between said twin bands for raising pallets from said twin bands; and support means positioned above said elevating means for holding pallets while said elevating means is lowered.

2. A machine as claimed in claim 1 wherein the elevating means is connected to one end of a lever, the other end of the lever being connected to a power cylinder capable of pivoting said lever about its fulcrum thereby raising or lowering said elevating means.

3. A machine as claimed in claim 1 wherein the support means comprises a plurality of pivoted members capable of being rotatably moved from a support position by contact with a rising pallet whereby the pallet passes the pivoted members which thereupon resume their support position.

4. A machine as claimed in claim 3 wherein the pivoted members are loose fitting on a pair of spaced parallel shafts, the distance apart of the shafts being greater than the width of the pallets.

5. A machine as claimed in claim 4 wherein stop members are provided on the shafts which engage with a projection on the pivoted members whereby movement of the pivoted members is limited.

6. A machine as claimed in claim 1 which is capable of being moved on a wheel and track arrangement.